US011421380B2

(12) United States Patent
Gstettner

(10) Patent No.: US 11,421,380 B2
(45) Date of Patent: Aug. 23, 2022

(54) METHOD FOR MANUFACTURING A FLAME-RESISTANT TEXTILE MATERIAL FOR PROTECTIVE CLOTHING, FLAME-RESISTANT TEXTILE MATERIAL, AND PROTECTIVE CLOTHING MADE THEREOF

(71) Applicant: TRANS-TEXTIL GmbH, Freilassing (DE)

(72) Inventor: Alexander Gstettner, Roitham (AT)

(73) Assignee: TRANS-TEXTIL GmbH, Freilassing (DE)

( * ) Notice: Subject to any disclaimer, the term of this patent is extended or adjusted under 35 U.S.C. 154(b) by 265 days.

(21) Appl. No.: 15/749,579

(22) PCT Filed: Jul. 27, 2016

(86) PCT No.: PCT/EP2016/067882
§ 371 (c)(1),
(2) Date: Feb. 1, 2018

(87) PCT Pub. No.: WO2017/025328
PCT Pub. Date: Feb. 16, 2017

(65) Prior Publication Data
US 2018/0223473 A1    Aug. 9, 2018

(30) Foreign Application Priority Data
Aug. 13, 2015    (DE) .................... 10 2015 010 524.8

(51) Int. Cl.
*D06M 23/16*    (2006.01)
*B32B 5/02*    (2006.01)
(Continued)

(52) U.S. Cl.
CPC .......... *D06M 23/16* (2013.01); *A41D 31/085* (2019.02); *B32B 3/26* (2013.01); *B32B 5/022* (2013.01);
(Continued)

(58) Field of Classification Search
USPC .................... 442/143, 302, 304; 57/236, 273
See application file for complete search history.

(56) References Cited

U.S. PATENT DOCUMENTS 3,716,326 A * 2/1973 Dutta ....................... D06Q 1/02
                                                     8/480
4,361,674 A * 11/1982 Lawrence ................. D01F 6/94
                                                     264/178 F
(Continued)

FOREIGN PATENT DOCUMENTS

| DE | 196 02 833 | 8/1997 |
| DE | 199 12 546 | 9/2000 |

(Continued)

OTHER PUBLICATIONS

International Search Report for PCT/EP2016/067882, dated Sep. 27, 2016, 4 pages.
(Continued)

*Primary Examiner* — Lynda Salvatore
(74) *Attorney, Agent, or Firm* — Nixon & Vanderhye P.C.

(57) ABSTRACT

A method for manufacturing a flame-resistant textile material for protective clothing is characterized in that at least one textile layer is subjected to a treatment step wherein at least one fibre component is at least partially detached from the textile layer such that air chambers (5) are formed.

14 Claims, 2 Drawing Sheets

Figure 1A:
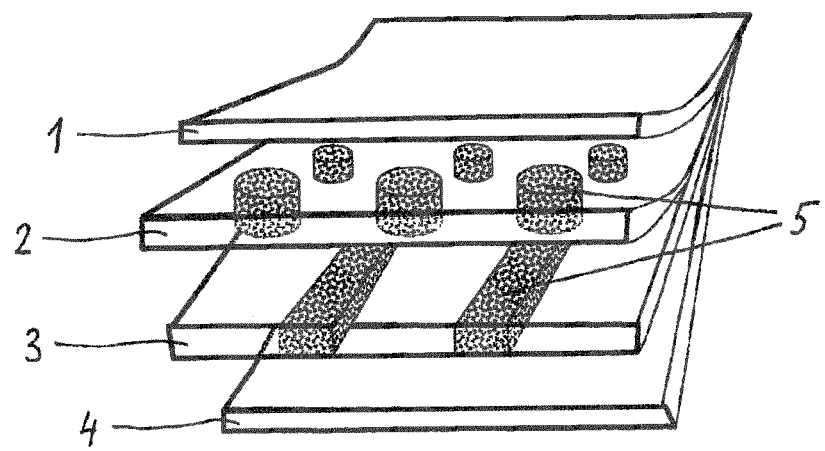

(51) Int. Cl.
| | |
|---|---|
| *B32B 27/12* | (2006.01) |
| *B32B 5/14* | (2006.01) |
| *B32B 3/26* | (2006.01) |
| *D04B 1/16* | (2006.01) |
| *B32B 5/24* | (2006.01) |
| *B32B 5/06* | (2006.01) |
| *B32B 5/08* | (2006.01) |
| *A41D 31/08* | (2019.01) |
| *B32B 5/26* | (2006.01) |
| *B32B 27/40* | (2006.01) |
| *B32B 37/12* | (2006.01) |
| *B32B 38/10* | (2006.01) |
| *B32B 38/00* | (2006.01) |
| *D06M 13/148* | (2006.01) |
| *D06M 13/256* | (2006.01) |
| *D06M 15/17* | (2006.01) |
| *D06M 101/06* | (2006.01) |
| *D06M 101/18* | (2006.01) |
| *D06M 101/36* | (2006.01) |

(52) U.S. Cl.
CPC .............. *B32B 5/024* (2013.01); *B32B 5/026* (2013.01); *B32B 5/06* (2013.01); *B32B 5/08* (2013.01); *B32B 5/142* (2013.01); *B32B 5/147* (2013.01); *B32B 5/24* (2013.01); *B32B 5/26* (2013.01); *B32B 27/12* (2013.01); *B32B 27/40* (2013.01); *B32B 37/1207* (2013.01); *B32B 38/10* (2013.01); *B32B 38/145* (2013.01); *D04B 1/16* (2013.01); *D06M 13/148* (2013.01); *D06M 13/256* (2013.01); *D06M 15/17* (2013.01); *B32B 2250/03* (2013.01); *B32B 2250/20* (2013.01); *B32B 2255/02* (2013.01); *B32B 2255/24* (2013.01); *B32B 2262/0223* (2013.01); *B32B 2262/0246* (2013.01); *B32B 2262/0269* (2013.01); *B32B 2262/04* (2013.01); *B32B 2262/062* (2013.01); *B32B 2262/065* (2013.01); *B32B 2262/08* (2013.01); *B32B 2262/14* (2013.01); *B32B 2305/182* (2013.01); *B32B 2305/186* (2013.01); *B32B 2305/188* (2013.01); *B32B 2305/20* (2013.01); *B32B 2307/21* (2013.01); *B32B 2307/304* (2013.01); *B32B 2307/3065* (2013.01); *B32B 2307/402* (2013.01); *B32B 2307/7166* (2013.01); *B32B 2307/724* (2013.01); *B32B 2307/728* (2013.01); *B32B 2317/18* (2013.01); *B32B 2329/04* (2013.01); *B32B 2375/00* (2013.01); *B32B 2377/00* (2013.01); *B32B 2437/00* (2013.01); *B32B 2571/00* (2013.01); *D06M 2101/06* (2013.01); *D06M 2101/18* (2013.01); *D06M 2101/36* (2013.01); *D06M 2200/30* (2013.01); *D10B 2321/06* (2013.01); *D10B 2331/021* (2013.01); *D10B 2403/0112* (2013.01)

(56) References Cited

U.S. PATENT DOCUMENTS

| | | |
|---|---|---|
| 4,812,145 A | 3/1989 | Labonte |
| 7,520,121 B2 * | 4/2009 | Teshima .................. D02G 3/32 57/236 |
| 2011/0275263 A1 * | 11/2011 | Li .......................... D03D 15/12 442/142 |

FOREIGN PATENT DOCUMENTS

| | | |
|---|---|---|
| DE | 602 25 251 | 3/2009 |
| EP | 1 975 296 | 10/2008 |
| WO | WO 2008/148126 | 12/2008 |
| WO | WO 2012/096921 | 7/2012 |
| WO | WO 2012/167298 | 12/2012 |

OTHER PUBLICATIONS

International Preliminary Report for PCT/EP2016/067882 dated Jul. 13, 2017.

* cited by examiner

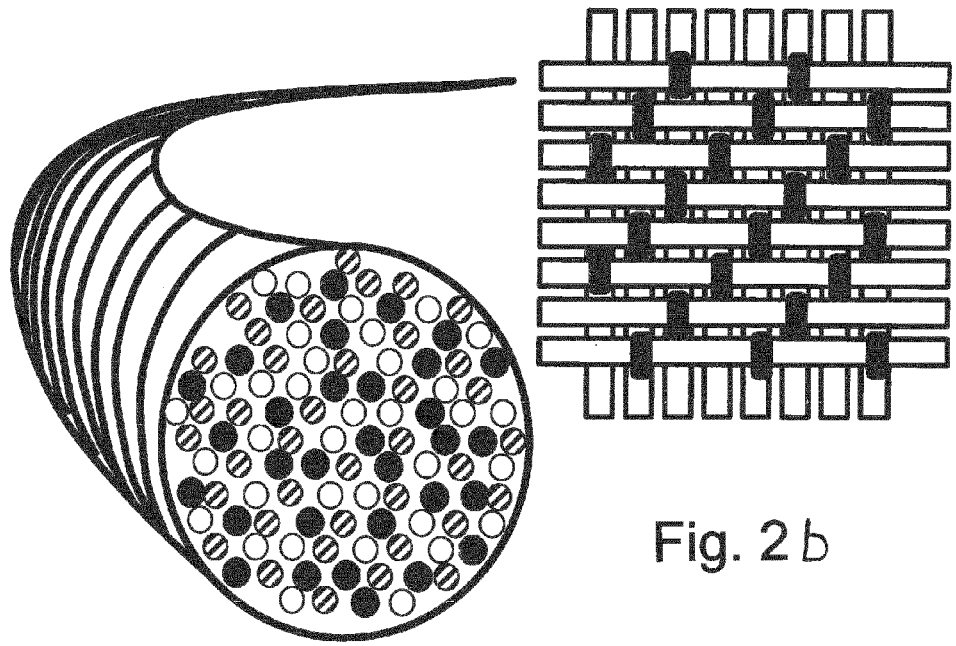
○ Flame-resistant cellulose fibre
● Flame-resistant synthetic fibre
⊘ Polyvinyl alcohol fibre
Fig. 2a
Fig. 2b
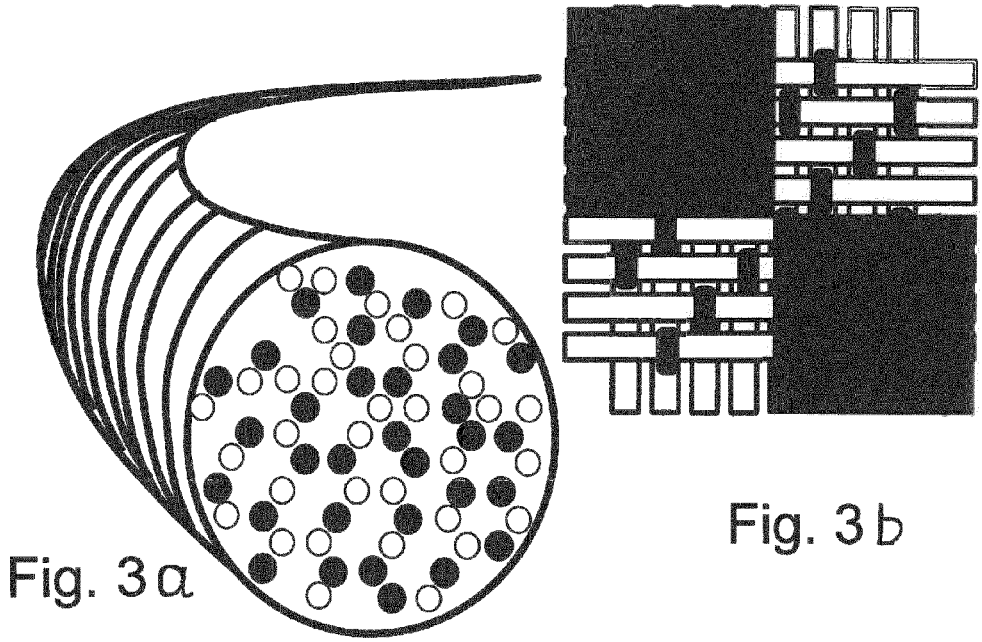
Fig. 3a
Fig. 3b

METHOD FOR MANUFACTURING A FLAME-RESISTANT TEXTILE MATERIAL FOR PROTECTIVE CLOTHING, FLAME-RESISTANT TEXTILE MATERIAL, AND PROTECTIVE CLOTHING MADE THEREOF

This application is the U.S. national phase of International Application No. PCT/EP2016/067882 filed 27 Jul. 2016, which designated the U.S. and claims priority to DE Patent Application No. 10 2015 010 524.8 filed 13 Aug. 2015, the entire contents of each of which are hereby incorporated by reference.

The invention relates to a method for producing a flame-resistant textile material for protective clothing according to the preamble of claim 1, to a flame-resistant textile material according to claim 9 that is produced by means of such a method, and to an item of flame-resistant protective clothing according to claim 12, which is at least predominantly made of such a textile material.

Flame-resistant protective clothing is required by firefighters, in particular, for protection against heat and flames in dangerous situations and during fire-fighting operations. In this case, the clothing is expected to protect the skin of the wearer when in direct contact with heat and flames and to therefore reduce the risk of burn injuries.

Furthermore, protective clothing that protects against heat and flames is also required by police and security personnel, people in the military, those taking part in motorsports and industrial workers, for example in the gas and chemical industry, and by people that work in high-voltage and low-voltage electrical areas and who are exposed to the risk of electrical arc flashes.

It is known to use single-layer protective clothing made of leather or very heavy cotton or wool materials, which are made flame-resistant by being impregnated with special chemicals, in order to protect against heat and flames. However, this clothing only provides a limited amount of protection.

Furthermore, protective clothing made of flame-resistant chemical fibres that consist of natural or synthetic polymers, for example aramid fibres or flame-resistant viscose fibres, is known.

The high requirements relating to the protective effect of firefighter turnout gear, which requirements are now set by standards, can only be met by multi-layer, special clothing designs. Although these new, multilayer clothing designs provide a high degree of protection against heat and flames, they subject the wearer to a particularly high degree of heat stress due to poor dissipation of body heat. This heat stress can place the wearer under a huge amount of physiological stress, which may lead to them collapsing or even dying. Another disadvantage of the protective clothing known thus far is its heavy weight and poor wear comfort.

Therefore, the object of the invention is to provide a method for producing a flame-resistant textile material for protective clothing, which, in addition to being highly flame-resistant, subjects the person wearing the protective clothing to a smaller amount of physiological stress, in particular less heat stress, and has improved breathability and a lower weight. Furthermore, a textile material and an item of protective clothing consisting of such a textile material having these properties are intended to be provided.

This object is achieved according to the invention by a method according to claim 1, by a flame-resistant textile material according to claim 9 and by an item of flame-resistant protective clothing according to claim 12. Advantageous embodiments of the invention are described in the additional claims.

In the method according to the invention, the textile material is formed of at least one textile layer that contains at least two different fibre components and is subjected to a treatment step in which at least one of the fibre components is extracted from the textile layer at least in part.

By means of the method according to the invention, a textile material can be produced, which comprises air chambers that provide additional insulation and therefore sustains the protection against heat and flames, while at the same time significantly reducing the weight of the textile material, optimally transporting moisture and also providing unlimited design options.

The advantages of the textile material produced by means of the method according to the invention or the item of protective clothing made of such a textile material can be summarised as follows:
- outstanding protection against heat and flames
- reduced clothing weight
- extremely breathable and air-permeable
- lower heat stress
- ultimate wear comfort
- high degree of moisture absorption
- fast moisture transport
- rapid re-drying, less moisture in the clothing system
- soft feel, high textile flexibility
- unlimited pattern possibilities
- customised applications in clothing parts are possible (body mapping), and
- direct bonding of the seams is possible in laminates According to an advantageous embodiment of the method according to the invention, at least one fibre component is extracted from the textile layer by means of discharge printing. In this case, the textile layer preferably comprises cellulose fibres and synthetic fibres, a discharge paste being applied to the textile layer, which discharges the cellulose fibres when the discharge paste is thermally activated at temperatures above 150° C.

Alternatively or in addition, the textile layer can comprise a water-soluble fibre component, the textile layer being subjected to a treatment step in which the water-soluble fibre component is washed out of the textile layer at least in part.

According to an advantageous embodiment, the water-soluble fibre component consists of polyvinyl alcohol fibres, the polyvinyl alcohol fibres being washed out by means of a slightly acidic aqueous solution having a pH of between 4 and 5.

According to an advantageous embodiment, the textile layer comprises both a first fibre component, which can be extracted from the textile layer by means of a discharge paste, and a second water-soluble fibre component, which can be washed out of the textile layer by means of an aqueous solution, the first fibre component being extracted from the textile layer by means of a discharge printing treatment and the second water-soluble fibre component being extracted from said textile layer by means of a washing-out treatment.

The first fibre component treated with the discharge paste and the second water-soluble fibre component can preferably be extracted at the same time in a washing-out step.

Alternatively, the first fibre component treated with the discharge paste and the second water-soluble fibre component can also be extracted at the same time during a dyeing process.

The flame-resistant textile material produced by means of the method according to the invention preferably comprises at least one textile layer, of which at least 10 to 60% consists of cellulose fibres, 10 to 60% consists of water-soluble polyvinyl alcohol fibres and 10 to 60 consists of fibres from the group consisting of flame-resistant chemical fibres made of synthetic polymers, or the group consisting of protein fibres, or a blend of fibres from the two groups.

In the context of the present invention, all of the percentages stated are percentages by weight, unless expressly stated otherwise.

On the basis of the weight of the textile layer before the fibres are removed, from 1 to 25 chemical fibres made of burnable synthetic polymers are preferably added to the textile layer. Such polymers added to the textile layer can influence or improve certain properties of the textile material, for example the abrasion behaviour, in a targeted manner.

Yarns that consist of an intimate blend of soluble and insoluble staple fibre components are advantageously used for the textile layer.

According to an advantageous embodiment, yarns can be used for the textile layer which, in warp and weft, consist of a thread, at least one single yarn consisting of a soluble fibre component and at least one single yarn consisting of an insoluble fibre component.

The cellulose fibres are advantageously made flame-resistant either during or after fibre production by a flame retardant.

The cellulose fibres are advantageously selected from the group consisting of cotton, hemp, linen, ramie, viscose, rayon, cupro, acetate, triacetate, modal, lyocell or a blend thereof.

The flame-resistant chemical fibres made of synthetic polymers are advantageously selected from the group consisting of para-aramid, meta-aramid, aromatic PES, PBI, melamine resin, novoloid, modacrylic and FR polyamide, either in pure form or in a blend thereof.

The protein fibres are advantageously selected from the group consisting of wool and silk, either in pure form or in a blend thereof.

The yarns used are advantageously continuous filaments of silk, cellulose and chemical fibres made of synthetic polymers, or the yarns are produced from the continuous filament by chopping conversion or stretch-broken spinning technology.

Antistatic fibres are advantageously added to the yarns or the yarns comprise woven lattice structures as a result of antistatic filaments, by means of which antistatic properties can be achieved.

One or more fibre components are advantageously spun-dyed, flock-dyed, top-dyed in the yarn or fabric-dyed.

The textile layer is advantageously produced by means of weaving, weft-knitting, warp-knitting or non-woven technology.

The textile layer is advantageously used as a quilted composite having one or more textile layers, as an intermediate insulating layer, as a laminate or bonding connected to one or more textile layers, and as a carrier for coatings.

The textile material advantageously comprises a plurality of textile layers, a fibre component being extracted from at least one textile layer by means of discharge printing and a water-soluble fibre component being washed out of at least one other textile layer.

Figure 1B:
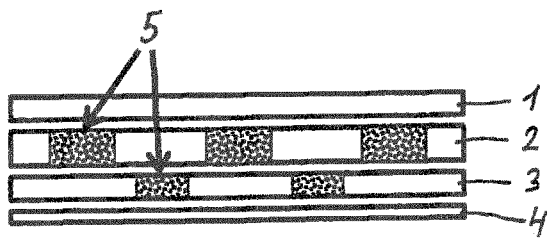
Figure 4:
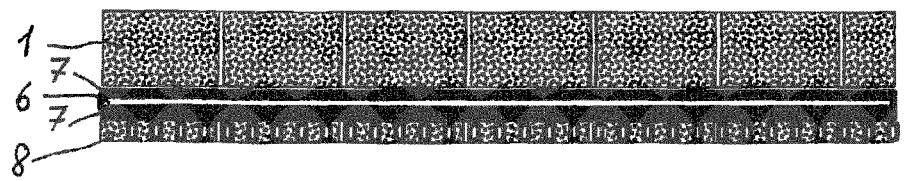

The invention will be explained in more detail in the following on the basis of drawings and examples. In the drawings:

FIG. 1a is a schematic view of a multilayer textile material according to the invention, FIG. 1b shows the textile material from FIG. 1a in cross section, FIG. 2a is a cross section of a yarn used in the textile material according to the invention, which has three different fibre components, before the method according to the invention is applied, FIG. 3a shows the yarn from FIG. 2a after the discharge printing treatment and washing-out treatment according to the invention have been carried out, FIG. 2b shows a fabric having different fibre components before the method according to the invention is applied, FIG. 3b shows the fabric from FIG. 2b after the discharge printing method and the washing-out method according to the invention have been applied, and FIG. 4 is a cross section through a triple-layer laminate of the piece of protective clothing according to the invention.

FIGS. 1a and 1b show a flame-resistant textile material consisting of four layers, which can be used for flame-resistant protective clothing, for example for the fire brigade.

The textile material comprises four textile layers, specifically an outer layer 1, a first insulating layer 2, a second insulating layer 3 and a lining 4 that forms the innermost textile layer.

In this embodiment, the two insulating layers 2, 3 comprise air chambers 5, which are formed by one or more fibre components from the finished textile layers subsequently being extracted once again from the finished textile layer by applying one of the different method variants described in the following. In this case, the air chambers 5 improve the insulating properties of the textile material and therefore the protection against heat and flames; however, the weight of the finished item of protective clothing is significantly reduced at the same time, moisture can be optimally transported, and unlimited design options are also made possible.

The shape, size and arrangement of the air chambers 5, which are only shown schematically in FIGS. 1a and 1b, and the number and composition of the individual textile layers can vary a great deal in this case. The essential principle is that one or more fibre components are subsequently partially or fully removed from one or more finished textile layers, thus correspondingly reducing the density in those regions where the fibres have been removed.

Three method variants for producing the flame-resistant textile material according to the invention will be described in more detail in the following.

Method 1 (Discharge Printing Method)

In discharge printing, a discharge paste is applied to the textile layer in a specific pattern and, once dried, is thermally activated at elevated temperatures so that specific fibre components can be discharged and subsequently re-extracted from the textile layer.

The discharge paste consists of the following components, for example:

170 parts p-toluenesulfonic acid (alternatively, other discharge components such as sodium hydrogen sulfate/sodium bisulfate, methanesulfonic acid or an alkyl naphthalene sulfonic acid mixture can also be used)
80 parts glycerol
80 parts Polygylkol 400
500 parts of a 5% plant seed gum thickener or alternative thickening agent
170 parts water The discharge paste is imprinted in a predetermined pattern on a textile, which consists for example of cellulosic and synthetic fibres, in particular by means of rotary screen printing, and the fabric is then dried in a stenter at 80° C. The discharge paste is subsequently heat-treated at 190° C. for 40 seconds and is thermally activated. It is then rinsed on an open-width washing range, for example, and the destroyed cellulose fibre content is washed out, the textile layer is washed with soap and dried by means of a stenter or a drying apparatus and method corresponding to the textile layer.

Method 2 (Washing-Out Water-Soluble PVA Fibres)

In this method, the textile layer is produced from a blend of water-insoluble fibres and water-soluble polyvinyl alcohol fibres (for example Kuralon K-II). The blend can either be in fibre or yarn form. Once the textile layer has been produced, the water-soluble fibre component is washed out in a slightly acidic aqueous solution having a pH of between 4 and 5. This washing process can last for approximately 30 minutes. A rinsing process lasting around 10 minutes is then carried out at 40° C. The Kuralon K-II fibre is fully dissolved without leaving any residue. After this production step, the textile layer is held taut on the stenter and dried.

The soluble polyvinyl alcohol fibres in a blend of flame-resistant fibres can alternatively also be washed out at the same time during a subsequent dyeing process that is suitable for the fibre materials.

For example, viscose FR fibres in a blend of aramid, viscose FR and polyvinyl alcohol can be dyed black by means of jiggers (jet dyeing apparatus or CPM (cold pad method)) as follows:

Jigger Dyeing:
 20 min prewash at 80° C. with 1 g/l Kiralon Jet, 1 g/l sodium carbonate then rinsed in warm and cold water.

Dyeing Using a Liquor Ratio of 1:20
 Levafix dark-blue E-BNA 4%, Levafix red E-BA 2%
 80 g/l sodium sulfate, 10 g/l sodium carbonate, 3 g/l sodium bicarbonate, 1 g/l Albegal FFA, 1 g/l Persoftal L The following dye curve describes the sequence of the dyeing process in relation to time (min), temperature (° C.) and the use of chemicals.

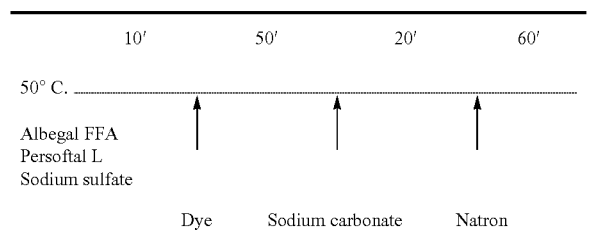

After being dyed, the textile material is rinsed with cold water, acidified with 1 ml/l acetic acid (10 min at 40° C.). The material is washed with soap using 1 g/l Kieralon JET at 90° C. and for 20 min. The dyeing process is finished with an additional warm and cold rinsing process.

During this dyeing process, in addition to dyeing the flame-resistant viscose FR fibre, the polyvinyl alcohol fibre is removed at the same time, without leaving any residue.

It is evident that this method is a very efficient method for producing textiles. As a result of the proportion of polyvinyl fibres, material costs are also saved in comparison with pure flame-resistant fibre blends.

Depending on the intended use or additional processing, the textile layer can, for example, be further finished by a light-weight stabilising resin that reduces creasing (e.g. 70 g/l Knittex FÜR conc. of 15 g/l magnesium chloride, 0.5 g/l sodium fluoroborate, 60 g/l Ultratex 7359, 30 g/l Turpex VU, 3 g/l VUK catalyst) or by an oil and water repellant.

Method 3 (Combination of the Discharge Printing Method and Method 2)

In this method, a textile layer is produced which consists of at least three fibre components, specifically
 water-soluble PVA fibres
 flame-resistant cellulose fibres, and
 flame-resistant synthetic fibres A blend of these three fibre components is processed according to the process for producing textiles, either in fibre form as nonwovens or as a yarn to form a textile layer. A discharge paste, as described in method 1, is imprinted on the textile layer in the form of a pattern. The textile layer is then dried at 80° C. and the discharge paste is thermally activated at 200° C. for 40 seconds in a stenter.

In the following washing-out process carried out at 80-95° C. for 30 minutes, the discharged cellulose fibre content and the polyvinyl alcohol fibre are washed out and removed at the same time in one process step in a multi-chamber open-width washing range. After this production step, the textile surface is held taut on the stenter and dried.

Depending on the intended use or additional processing, the textile surface can optionally be further finished, for example by a stabilising resin or by an oil and water repellant.

In order to improve abrasion resistance, a small amount, preferably from 5 to 20%, of standard synthetic fibres, for example polyamide fibres, can be admixed, as the fourth component, to the third blend described.

The result is a new, extremely light-weight material consisting of very fine yarns in a two-fibre blend of flame-resistant cellulose fibres and synthetic fibres (PVA fibres have been completely removed) in combination with pattern-analogous points in the material, which only consist of synthetic fibres. A three-dimensional textile layer consisting of only two or one pattern-analogous fibre component(s) is produced from a textile layer having three fibre components.

This is clearly shown in FIGS. 2a, 2b, 3a and 3b.

FIG. 2a shows a yarn in the untreated initial state, which consists of water-soluble PVA fibres, flame-resistant cellulose fibres and flame-resistant synthetic fibres. FIG. 2b is a view from above of a textile layer in the untreated initial state.

FIG. 3a shows the yarn in FIG. 2a after the water-soluble PVA fibres have been washed out in accordance with method 3. FIG. 3b shows the textile layer in FIG. 2b after the textile layer has been fully treated in accordance with method 3, i.e. after the textile layer is not only free of the PVA fibres but has additionally been treated using the discharge printing method. The black square regions correspond to the discharged points. By additionally extracting the flame-resistant cellulose fibres, (additional) air chambers are provided, which reduce the weight and also provide insulation and promote breathing.

Protective Clothing

Flame-resistant protective clothing preferably comprises a plurality of textile layers. The textile layer produced by means of the method according to the invention can preferably be used as the innermost layer (lining) of the textile material or protective clothing. A plurality of layers can also be processed together, for example in the form of a laminate carrier, insulating layer and as a lining, which is quilted by the insulating layer to form a quilted lining. The item of protective clothing according to the invention can also consist of a triple-layer laminate, with each of the layers, one of the layers or two of the layers consisting of a textile layer that has been produced by means of the method according to the invention, in particular by means of one of methods 1-3 described above. Furthermore, there is the possibility of using the textile layers according to the invention as a carrier for all types of direct coatings.

The item of flame-resistant protective clothing of the invention can include all types of protective clothing:

Jackets, coats, trousers, shirts, polo shirts, jumpers, waistcoats, sweatshirts, t-shirts, socks, aprons, gloves, head protection hoods and head protection items, and any other items of clothing that are worn for protection against heat, flames, arc flashes and similar risks and are made up of several layers.

EXAMPLE 1

An item of protective clothing worn by firefighters and consisting of a work jacket and work trousers was produced from the following material structure:

A. outer layer
B. new moisture barrier
C. new quilted lining

A. Outer Layer:

The outer layer consisted of 100% aramid (Nomex Tough) 75/23/2 Nomex/Kevlar/P140 antistatic fibres; 195 g/m$^2$ binding Z twill 2/1; dark-blue.

B. Moisture Barrier Laminate:

A water jet-reinforced non-woven, consisting of 50% aramid fibres and 50% viscose FR having a weight of 80 g/m$^2$ and a thickness of 0.83 mm, was printed on by means of rotary printing, in a similar manner to method 1, with a discharge paste and with an all-over pattern, consisting of round circles having a diameter of 0.7 cm and a mutual spacing of 0.5 mm. The water jet nonwoven fabric printed on was then dried at 80° C. and heat-treated at 190° C. for 40 sec. The destroyed viscose FR content was then washed out. The result was a 60 g/m$^2$ light-weight water-jet nonwoven fabric consisting of 50/50 aramid/viscose FR having points that consist only of 100% aramid fibres. By extracting the viscose fibres, not only was the weight reduced, but the nonwoven fabric was made more insulating, since the remaining aramid fibres retain the volume and air is trapped in the textile instead of the viscose FR. This new textile layer was then laminated with a PU membrane by means of hot-melt lamination. The adhesive and membrane collectively had a weight of approximately 40 g/m$^2$ so that ultimately a total laminate weight of 100 g/m$^2$ was produced.

C. Quilted Lining

A quilted lining was produced from the new water-jet nonwoven fabric, which was described in point B, in combination with a new cover fabric. The new cover fabric was a light-weight lining fabric consisting of 40% aramid fibres, 1.4 dtex/51 mm staple length (Nomex), spun-dyed dark-blue 40% viscose FR fibres, 2.2 dtex/51 mm staple length (Lenzing FR), raw-white 20% polyvinyl alcohol fibres, 2.2 dtex/51 mm staple length (Kuralon K-II), raw-white.

The fibres were intimately blended in a blending plant before being spun and conventionally spun out using a three-cylinder spinning method to form an Nm 65/2 yarn. This yarn was then interwoven with 23 strands/cm in the warp and 23 strands/cm in the weft to form a 135 g/m$^2$ material. The material (textile material) was a mixed-blue colour as a result of the fibre blend.

This material was then treated by means of method 3 as follows: imprinting a discharge paste in the manner of an all-over pattern by means of rotary printing. The pattern consisted of a chequerboard square. The textile material was then dried at 80° C. and heat-treated at 190° C. for 40 sec. It was then washed with a washing liquor having a pH of between 4 and 5 in a washing process lasting approximately 20 minutes and rinsed in the subsequent rinsing process for approximately 10 minutes at 40° C. After this production step, the textile material was held taut on the stenter and dried. The result was a textile material having a final weight of 90 g/m$^2$ that consists of a very light-weight surface of 50/50 aramid/viscose FR having a mixed-blue colour and dark-blue squares consisting of 100% aramid fibres. By applying method 3, a new material was produced, which differs from the starting material in terms of its weight, performance and appearance. Reference is made to FIG. 2a-3b.

This new material was then quilted in a diamond pattern with the new water-jet nonwoven fabric, the production of which was described in point B, having a red quilted strand consisting of 100% PES.

The result was an extremely light-weight quilted lining having a total weight of approximately 150 g/m$^2$.

Components A, B and C were assembled to form a structure used by the fire brigade. This new structure was tested in comparison with the original structure according to the requirements of standard EN 469: "protective clothing for firefighters" and on the basis of additional essential parameters that are described in the following. The samples were pretreated according to EN 6330: 5×60° C.+tumble drying at a normal temperature. The results show that even though it is lighter by 85 g/m$^2$, the new structure offers the same protective effect as well as improved physiological efficiency. For protective clothing in the form of a suit, approximately 5 running metres of material were required, which provided a significant reduction in weight of the overall suit of approximately 637 g. Furthermore, it became apparent that the textile material according to the invention absorbs less moisture and dries quicker. The GATS test (Gravimetric Absorbency Testing System) was used as the method for testing the water absorption capacity of textiles.

Moisture has a significant influence on the level of protection of personal protective clothing. A number of independent studies confirm that protective clothing having less moisture in the system offers better protection, especially when the wearer is exposed to low radiation heat over an extended period of time. A low degree of moisture absorption is also advantageous with regard to the care properties of protective clothing, in particular the drying behaviour after industrial washing. Protective clothing used by firefighters, which dries quicker, can be re-used sooner after it has been used and therefore has considerable additional advantages for firefighters. Reference is made to table 2.

TABLE 2

|  | Total weight g/m² | Transmission of flame heat (sec) | Transmission of radiation heat (sec) | Water vapour transmission resistance RET (m²Pa/W) | GATS test (g/g) after 20 sec | Drying time (mg) after 20 min |
|---|---|---|---|---|---|---|
| New structure Outer shell 195 gsm New laminate 100 gsm New quilted lining 150 gsm | 445 | 16.2 | 18.5 | 14.0 | 2.1 | 210 |
| Structure comprising original fabric Outer shell 195 gsm Laminate 120 gsm Quilted lining 215 gsm | 530 | 16.1 | 18.7 | 20.7 | 2.0 | 425 |

Flame Protection:

Both the laminate B and the quilted lining C were tested according to EN ISO 15025 procedure A: "surface ignition" and could not be set on fire.

When igniting the surface of the material, although the fabric was blackened by the heat, it kept its structure, did not display the formation of any holes and continued to function as an intact barrier against flames.

Afterflame time and afterglow of the material were tested according to EN ISO 15025 procedure A. The material displayed an afterflame time of 0 seconds in the warp direction and 0 seconds in the weft direction. (The standard allows 2 seconds).

To conclude, it can be said that the new flame-resistant protective clothing according to the invention not only offers the same protection against heat and flames, but primarily the weight of the item of protective clothing and consequently also the physiological impact on the wearer are significantly reduced. Breathability is maximised and therefore the risk of fatal heat stress is decreased.

EXAMPLE 2

A flame-resistant item of protective clothing for protection against electrical arc flashes was produced from the following 3-layer laminate:
A. new outer layer
B. breathable membrane
C. new knitted wrong side
A. New Outer Layer:
A fabric was produced from
25% aramid fibres, 1.4 dtex/51 mm staple length (Nomex), spun-dyed dark-blue
55% viscose FR fibres, 2.2 dtex/51 mm staple length (Lenzing FR), raw-white
20% polyvinyl alcohol fibres, 2.2 dtex/51 mm staple length (Kuralon K-II), raw-white The fibres were intimately blended in a blending plant before being spun and conventionally spun out to form an Nm 42/2 yarn using a three-cylinder spinning method. This yarn was then interwoven with 25 yarns/cm in the warp and 25 yarns/cm in the weft to form a 250 g/m² material. The material was a mixed-blue colour as a result of the fibre blend.

This material was then washed with a washing liquor having a pH of between 4 and 5 by means of method 2 in a washing process lasting 30 minutes and rinsed, washed with soap and rinsed in the subsequent rinsing process for approximately 10 minutes at 40° C. The polyvinyl alcohol fibres were removed without leaving any residue. After this production step, the fabric was held taut on the stenter and dried. The result was a textile material having a final weight of 200 g/m², consisting of a very light-weight surface of 35/65 aramid/viscose FR having a mixed-blue colour. By applying method 2, a new material was produced, which differs from the starting material in terms of its weight, performance and appearance (slightly darker mixed-blue colour).

C. New Knitted Wrong Side:

A single jersey knit fabric of 70 g/m² was produced on a circular knitting machine having a fineness of E24 from the following yarn:
three-cylinder yarn: simple yarn in Nm 50/1 consisting of:
50% aramid fibres, 1.7 dtex, 51 mm staple length, dark-blue
50% polyvinyl alcohol fibres, 2.2 dtex, 51 mm staple length.

The yarn had a multicoloured appearance.

The entire polyvinyl alcohol fibre content was then removed from the knit fabric in accordance with method 2. The knit fabric was washed in a washing process lasting 20 minutes with a washing liquor having a pH of between 4 and 5 and rinsed, washed with soap and rinsed in the subsequent rinsing process for approximately 7 minutes at 40° C. After this production step, the knit fabric was dried on a belt drier, which is suitable in particular for very light-weight knit fabrics, the edges were glued and said knit fabric was wound on a spool. The result was a dark-blue textile layer having a final weight of just 35 g/m², consisting of 100% aramid fibres. By applying method 2, a new material was produced which significantly differs from the starting material not only in terms of its weight, but above all in its openness and fineness and in its colour and appearance. It was also surprising that, by extracting the polyvinyl alcohol fibres, the fabric was approximately 20 cm wider!

The new textile surfaces A and C were then laminated by means of hotmelt lamination using a PTFE bicomponent membrane. Together the adhesive and membrane weighed approximately 45 g/m², so that ultimately a total laminate weight of 280 g/m² was produced.

Such a triple-layer laminate is shown in FIG. 4. The new outer layer A is denoted by reference numeral 1 here, the membrane B is denoted by reference numeral 6, the adhesive is denoted by reference numeral 7 and the new knitted wrong side C is denoted by reference numeral 8.

This laminate was tested against electrical arc flashes according to EN ISO 61482 1-2 at an arc current of 4 kA and 7 kA. The laminate met the necessary requirements with sufficient values according to Stoll (Stoll Curve) for 4 kA and also the requirements for 7 kA.

Normal designs move in weight classes of approximately 400-500 g/m² in order to achieve class 2 according to EN ISO 61482 1-2. The Stoll curve is a curve of thermal energy and time, which is formed from calculating the predicted potential second-degree burning of the human skin.

Breathability, Comfort and Thermophysiological Test Results:

The laminate according to the invention was tested for breathability, comfort and thermophysiological properties.

The result showed a very small amount of water vapour transmission resistance. The exceptionally good weldability of the seams using a triple-layer seam sealing tape should be pointed out in particular. Even after 25 industrial washes at 60° C. and tumble-drying as per ISO 15797, the seams were tight at 60,000 Pa. This excellent weldability can be attributed to the very open structure of the new knit fabric.

Another important advantage of the new protective clothing consisting of the laminate produced is the reduction in costs, since polyvinyl alcohol fibres are significantly cheaper than aramid or viscose FR, and these expensive fibres are replaced with substantial amounts of polyvinyl alcohol fibres in a yarn. Although the additional washing process for extracting the fibres constitutes an additional cost, when producing the textiles, wet treatment is required in any case in order to stabilise shrinkage from washing (mainly caused by the viscose FR fibres) and to relax the textile. Since said blend does not contain any fibres that melt, thermal fixing, as in PES materials, is not possible.

In conclusion, it can be asserted that the new item of flame-resistant protective clothing according to the invention, which consists of the new triple-layer laminate not only provides exceptional protection against electrical arc flashes, but is above all also very light-weight and breathable. The laminate is exceptionally soft and pleasant to touch in comparison with conventional triple-layer laminates that are based on 100% aramid fibres and bicomponent PTFE membranes. Above all, due to the new wrong side, excellent welding and tightness of the seams is achieved.

EXAMPLE 3

An item of flame-resistant protective clothing in the form of a two-layer head protection hood for use by firefighters was produced as follows:

An interlock knit fabric of 190 g/m² was produced on a circular knitting machine having a fineness of E24 from the following yarn:

three-cylinder yarn: simple yarn in Nm 50/1 consisting of:
40% aramid fibres, 1.7 dtex, 51 mm staple length, dark-blue
40% viscose FR fibres, 2.2 dtex, 51 mm staple length, raw white
20% polyvinyl alcohol fibres, 2.2 dtex, 51 mm staple length, raw white The resulting knit fabric had a multicoloured appearance.

This material was then treated by means of method 3 as follows: imprinting a discharge paste in the manner of an all-over pattern by means of rotary printing. The pattern consisted of a 2 cm-wide chequerboard square. The textile surface was then dried at 80° C. and heat-treated at 190° C. for 40 sec. It was then washed with a washing liquor having a pH of between 4 and 5 in a washing process lasting approximately 20 minutes and rinsed, washed with soap and rinsed in the subsequent rinsing process for approximately 10 minutes at 40° C. After this production step, the textile material was held taut on the stenter and dried. The result was a textile material having a final weight of 114 g/m², consisting of a very light-weight raised surface of 50/50 aramid/viscose FR having a mixed-blue colour and dark-blue squares of 100% aramid fibres.

By applying method 3, a new flame-resistant knit fabric was produced, which differs from the starting material in terms of its weight, performance and in particular its appearance.

This new knit fabric was then processed in two layers to form a head protection hood and tested according to EN ISO 13911 "head protection hoods for fire fighters".

Despite its low weight, the composite satisfied the requirements of the standard with very good results.

The new double-layer knit fabrics have a degree of air permeability that is several times higher than the original untreated knit fabrics and a lower weight.

The higher the degree of air permeability, the lower the risk of heat stress and heat stroke. In addition, the drying properties of the knit fabric are influenced to the highest possible extent by the degree of air permeability after washing (EN ISO 9237).

Alambeta—Heat Conductivity:

The knit fabric according to the invention was tested for its comfort properties.

The Alambeta test method measures the transmission of body heat through a material. The test specimen is positioned between two plates. One of the two plates has an ambient temperature and the other is heated to 35° C. in order to simulate the temperature of the skin. A temperature gradient is produced when the upper warm cylinder is suddenly lowered onto the material sample. Textiles having a high heat penetration coefficient feel colder and therefore make materials more comfortable to wear, particularly under hot, climatic conditions. The knit fabric according to the invention displays the highest heat penetration coefficient and therefor feels colder. However, the requirements in respect of the protective effect against 20 kW of radiation heat, tested according to EN ISO 13911, are guaranteed.

Reference is made to table 3.

Water Vapour Transmission Resistance RET:

By means of the skin model, it is possible to measure the transport of heat and moisture through a fabric. Said model is formed of a microporous plate, which simulates the human skin and can discharge water vapour. The apparatus is installed in a climate chamber having constant climatic conditions and a specified air flow, which is conducted over the test sample.

The water vapour transmission resistance (RET) is a measured value that indicates the resistance of water vapour through a textile material. The lower the RET, the lower the resistance and the higher the transfer of water vapour through the textile material. The value is measured according to ISO 11092 using the skin model. The RET is often also referred to as the breathability of materials.

The knit fabric of the invention displays, in the double-layered construction, the lowest amount of RET and the highest steam transfer through the material, and is therefore the better material compared with the original untreated textile with regard to breathability and wear comfort.

Reference is made to table 3.

TABLE 3 knit fabric test results

| | Heat penetration coefficient Alambeta (wm$^2$s1/2K-1) | Air permeability (l/m$^2$s) | Water vapour transmission resistance RET (m$^2$/Pa/W) |
|---|---|---|---|
| Double-layered knit fabric after treatment | 155 | 1500 | 6.2 |
| Original untreated double-layered knit fabric | 128 | 430 | 10.5 |

The invention claimed is:

1. A method for producing a laminate for protective clothing for protection against heat and flames, wherein the laminate comprises at least one textile layer that comprises a plurality of single multi-filament spun yarns spun from flame-resistant fibers comprising flame-resistant synthetic polymer fibers and flame-resistant cellulose fibers, wherein the flame-resistant synthetic polymer fibers contain at least one synthetic polymer selected from the group consisting of para-aramid, meta-aramid, aromatic PES, PBI, melamine resin, novoloid, modacrylic and FR polyamide, either in pure form or in a mixture thereof, and wherein the textile layer is subjected to a treatment step in which at least one of the flame-resistant synthetic polymer fibers and flame-resistant cellulose fibers is extracted from the plurality of single multi-filament spun yarns at least in part.

2. The method according to claim 1, wherein at least one of the flame-resistant synthetic polymer fibers and flame-resistant cellulose fibers is extracted from the multi-filament spun yarns by means of discharge printing.

3. The method according to claim 2, wherein a discharge paste is applied to the flame-resistant textile layer, which discharges the cellulose fibers when the discharge paste is activated at temperatures above 150° C.

4. The method according to claim 1, wherein the multi-filament spun yarns further comprises a water-soluble fiber, and wherein the flame-resistant textile layer is further subjected to a treatment step in which the water-soluble fiber is washed out of the flame-resistant textile layer at least in part.

5. The method according to claim 4, wherein the water-soluble fiber consists of polyvinyl alcohol fibers, and wherein the polyvinyl alcohol fibers are washed out by means of a slightly acidic aqueous solution having a pH of between 4 and 5.

6. The method according to claim 1, wherein the multi-filament spun yarns of the flame-resistant textile layer comprises both a first fiber, which can be extracted from the flame-resistant textile layer by means of a discharge paste, and a second water-soluble fiber, which can be washed out of the flame-resistant textile layer by means of an aqueous solution, the first fiber being extracted from the textile layer by means of a discharge printing treatment and the second water-soluble fiber being extracted from said textile layer by means of a washing-out treatment.

7. The method according to claim 6, wherein the first fiber treated with the discharge paste and the second water-soluble fiber are extracted at the same time in a washing-out step.

8. The method according to claim 6, wherein the first fiber treated with the discharge paste and the second water-soluble fiber are extracted at the same time during a dyeing process.

9. A flame-resistant textile material for protective clothing for protection against heat and flames, which is produced in accordance with a method according to claim 1.

10. The flame-resistant textile material according to claim 4, wherein the percentages of the fibers in the textile layer are 10-60% flame-resustant cellulose fibers, 10-60% water-soluble polyvinyl alcohol fibers, and 10-60% fibers from the group consisting of flame-resistant fibers made of synthetic polymers, protein fibers, and mixtures thereof.

11. The flame-resistant textile material according to claim 9, wherein the textile material comprises a plurality of textile layers, a fiber being extracted from said plurality of multi-filament spun yarns by means of discharge printing, and a water-soluble fiber being washed out of at least one other textile layer.

12. A flame-resistant protective clothing for protection against heat and flames, at least made of a flame-resistant textile material according to claim 9.

13. The method according to claim 5, wherein the percentages of the fibers in the flame-resistant textile material are 10-60% flame-resistant cellulose fibers, 10-60% water-soluble polyvinyl alcohol fibers, and 10-60% fibers from the group consisting of flame-resistant fibers made of synthetic polymers, protein fibers, and mixtures thereof.

14. The method according to claim 1, wherein the laminate comprises a flame-resistant textile material comprising a plurality of textile layers, a fiber being extracted from said plurality of multi-filament spun yarns by means of discharge printing, and a water-soluble fiber being washed out of at least one other textile layer.

* * * * *